Patented Mar. 30, 1954

2,673,888

UNITED STATES PATENT OFFICE 2,673,888

TREATMENT OF STORAGE BATTERY PLATES

Nicolas Melnikoff, Paris, France

No Drawing. Application January 9, 1950,
Serial No. 137,671

2 Claims. (Cl. 136—165)

It is known that the operation of lead storage batteries requires the presence of a certain quantity of lead sulphate. Unfortunately, this sulphate has the property, under certain conditions, of attacking the positive plates of the storage battery and of rendering them, in the course of time, so friable that the battery becomes useless.

Attempts have already been made, by means of the most varied methods, to eliminate, on the one hand the excess of lead sulphate, and on the other hand to regenerate the plates. It must however be admitted that it is not always possible to effect this regeneration.

My invention is intended, on the one hand to make it possible to regenerate the positive plates even if they are badly sulphated, and on the other hand to provide the protection of the plates from sulphating, even as a preventive measure.

The process according to the invention is based on the use of a certain proportion of the lead sulphate present in the storage battery, which is treated in such a manner as to produce a substance that covers the plates with a protecting layer, whereas the excess of sulphate is converted into a state in which it can be eliminated by merely washing with water.

This process can be applied to storage batteries in which the plates are badly sulphated, in which case the treatment simultaneously effects the regeneration and the subsequent protection of the plates and the elimination of the excess of sulphate.

It can also be applied to new batteries as a preventive treatment intended to render the plates more resistant to sulphating.

The process according to the invention essentially comprises, by temporarily substituting certain substances for the usual electrolyte of the battery and by means of certain electric charging and discharging operations, converting the lead sulphate, on the one hand into an insoluble lead salt that covers the plates with a protective crystalline casing, and on the other hand into a soluble sulphate that can be readily eliminated by merely washing. In this manner, positive plates are obtained that resist sulphating and, if necessary, the elimination of the excess of sulphate is obtained.

The process according to the invention comprises removing the electrolyte from a storage battery, washing the battery with running water, filling it with an aqueous solution of a soluble salt capable of producing, by double decomposition with the lead sulphate, a soluble sulphate and simultaneously an insoluble lead salt that can be decomposed into lead hydroxide, charging the battery to the maximum voltage which it is capable of reaching, so as to produce said double decomposition, rapidly discharging the battery down to a voltage value that allows of a normal charge being subsequently effected, so as to obtain an efficient conversion of the lead sulphate together with the dissolution in the electrolyte of the soluble sulphate formed, gradually adding, while charging the battery, a substance capable of converting the insoluble lead salt into lead hydroxide, so as to form on the plates of the battery, by means of the electrolysis that releases hydrogen, a crystalline casing that renders them rigid, less friable and more resistant to sulphating, removing the liquid charged with sulphate, washing the battery with running water, and filling it with an electrolyte containing sulphuric acid.

The process according to the invention is particularly applicable as a preventive treatment for new storage batteries, an artificial ageing, preferably for more than 48 hours, being necessary however in this case so as to determine the formation of a small quantity of sulphate for enabling the process to be carried out.

This preventive treatment prolongs the use of the batteries without desulphating, owing to the formation of a casing of protective crystalline substance on their positive plates.

By way of examples of salts which are capable of producing, by double decomposition with lead sulphate, the products hereinbefore referred to, mention may be made of ammonium carbonates, bicarbonates and cyanides. Provision is particularly made for the use of ammonium carbonate.

By way of examples of substances which are capable of converting the insoluble lead salt into lead hydroxide, mention may be made of caustic potash, caustic soda, sodium oxide and ammonia.

Provision is particularly made for effecting the above mentioned operations in the presence of wetting substances such as sulfonates, sulfonated derivatives of alcohols with a sufficiently long chain, active cation wetting agents and, in general, all substances which are capable of decreasing the surface tension of water. The addition of such substances provides the advantage of facilitating the penetration of the electrolyte into the plates and the removal of the gas from same.

In particular, the following precise example may be mentioned which, when studied experimentally, produced the most satisfactory results.

The electrolyte is removed from the battery, the battery is washed with running water and filled with an aqueous solution of ammonium carbonate in a proportion of 250 g. per litre of water; the battery is charged to its maximum voltage, which is recognized by the appearance of an effervescence, said voltage being about 2.2 volts. A double decomposition of the ammonium carbonate and the lead sulphate occurs, that produces on the one hand insoluble but still unstable lead carbonate, and on the other hand soluble ammonium sulphate according to the reaction:

$$PbSO_4 + (NH_4)_2CO_3 \rightarrow PbCO_3 + (NH_4)_2SO_4$$

The battery is rapidly discharged down to a voltage value not below the value for which the battery would no longer be capable of receiving a normal charge, said value being slightly above 1 volt and preferably between 1 volt and 1.3 volts. This discharge facilitates the dissolution in the electrolyte of the soluble ammonium sulphate.

Caustic soda is gradually added while charging the battery, the voltage across the terminals being watched until the instant when a quick increase of said voltage is obtained. The insoluble lead carbonate is then converted into lead hydroxide, according to the reaction:

$$PbCO_3 + 2NaOH \rightarrow Na_2CO_3 + Pb(CH)_2$$

On the other hand, the charging produces by means of electrolysis the release of the hydrogen of the lead hydroxide according to the formula:

$$Pb(OH)_2 \rightarrow PbO_2 + H_2$$

while the excess lead carbonate is at the same time hydrated to hydrocerussite $Pb_3(OH)_2(CO_3)_2$, which in intimate mixture with the lead dioxide forms a protecting crystalline casing on the plates. There only remains to empty the battery, wash it with running water and fill it with a normal electrolyte but of a specific gravity of about 45° Baumé in order to ensure the formation of a certain quantity of lead sulphate, which is necessary for the operation of the battery.

Of course, the invention is in no way restricted to the examples described which have only been given so as to enable the principle of the invention to be understood more clearly.

What I claim is:

1. A process of treating the sulphated plates of lead storage batteries comprising the steps of removing the electrolyte, rinsing the plates, filling the battery with an aqueous solution of an ammonium salt of carbonic acid, charging the battery to the maximum voltage which it is capable of reaching, so as to produce double decomposition to an insoluble lead salt of the carbonic acid and ammonium sulphate, rapidly discharging the battery to a voltage of 1-1.3 volt, thereby dissolving said ammonium sulfate, charging the battery, and gradually adding during the charge a compound selected from the group consisting of potassium hydroxide, sodium hydroxide, and ammonia, thereby developing hydrogen and converting at least part of said insoluble lead salt into a crystalline framework which renders the plates rigid, less friable and more resistant to sulphating, removing the liquid charged with sulphate, washing the battery with running water, and filling it with an electrolyte containing sulphuric acid.

2. A process as defined in claim 1 wherein an about 25% aqueous solution of the ammonium salt is used.

NICOLAS MELNIKOFF.

References Cited in the file of this patent

UNITED STATES PATENTS

| Number | Name | Date |
| --- | --- | --- |
| 915,980 | Luckow | Mar. 23, 1909 |
| 1,441,792 | Garbutt | Jan. 9, 1923 |
| 1,449,833 | Parker | Mar. 27, 1923 |

FOREIGN PATENTS

| Number | Country | Date |
| --- | --- | --- |
| 149,196 | Switzerland | Nov. 2, 1931 |
| 309,584 | Italy | July 11, 1933 |